Nov. 16, 1954  P. T. LENGYEL ET AL  2,694,432
EMERGENCY TRACTION CLEAT FOR TIRES
Filed Oct. 30, 1952  2 Sheets-Sheet 2
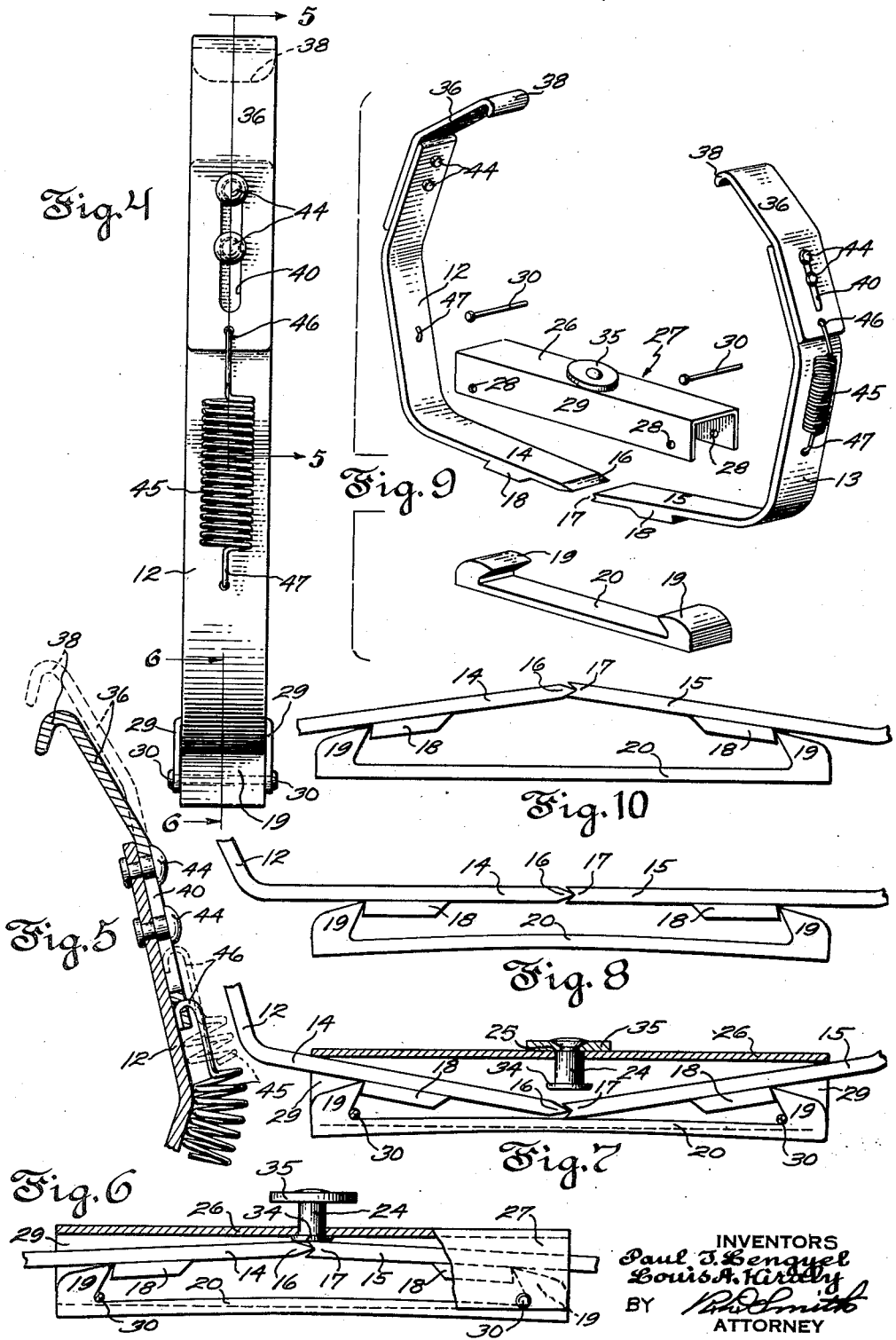
INVENTORS
Paul T. Lengyel
Louis A. Kiraly
BY
ATTORNEY

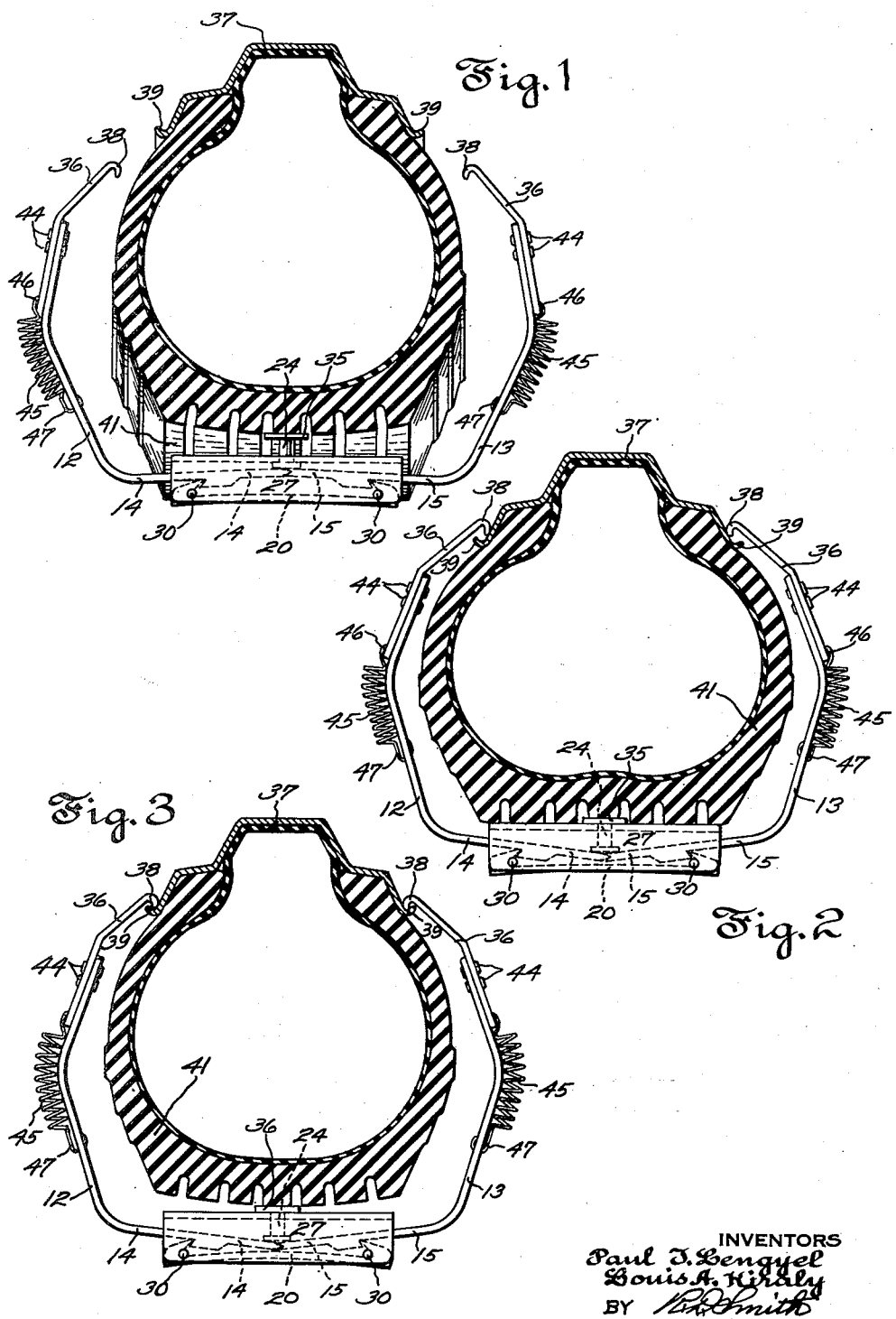

United States Patent Office 2,694,432
Patented Nov. 16, 1954

2,694,432

EMERGENCY TRACTION CLEAT FOR TIRES

Paul T. Lengyel, Bridgeport, and Louis A. Kiraly, Fairfield, Conn.

Application October 30, 1952, Serial No. 317,622

12 Claims. (Cl. 152—225)

This invention relates to emergency traction appliances for vehicle wheels in the nature of a readily attachable and detachable cleat as distinguished from so-called cross chains made of loosely coupled links.

So far as we are aware the cleats which have been proposed heretofore for emergency attachment to rubber tired fellies of vehicle wheels have required manual placement and fastening of the cleat on the wheel. This is a troublesome and difficult task on automobiles with bodies of modern design because the fenders leave exposed and accessible only a very small, hard-to-reach segment of the tire between the bottom edge of the fender and the ground. This has made it almost impossible to attach cross-chains or cleats as heretofore proposed without kneeling or lying on the ground and soiling one's clothing.

An object of this invention is to provide an effective traction assist device for emergency use in the form of a cleat which when rolled onto by the tire of an automobile wheel while lying on the roadbed will react to the pressure of the tire in a manner to attach itself automatically to the felly of the wheel without requiring manipulation of any kind.

A further object is to cause our improved emergency cleat to attach itself to the felly of the wheel in such manner that thereafter it will continue to cling firmly to the wheel by compensating for flattening deformation of a pneumatic tire each time the cleat, in revolving with the wheel, passes between the tire tread and the roadbed.

A further object is to make a cleat capable of the above novel performance with a minimum number of relatively movable parts that remain together as a unit and do not require detachment from one another to apply or remove the cleat, and that can be attached and detached from the tire by simple hand manipulation without the use of tools.

A still further object is to provide a single size of emergency cleat that can be successfully used on tires of various sizes.

A still further object is to provide a cleat which shall be so constructed as to be unimpaired in its self attaching action aforesaid by accumulation of dirt or rust in its mechanical parts.

These and related objectives of the invention will appear in fuller particular in the following description of a successful embodiment of the invention having reference to the appended drawings wherein:

Fig. 1 is an edgewise view of an emergency cleat embodying the invention as it lies on a roadbed when being approached by the tread of a pneumatic vehicle tire which is shown in section together with the wheel felly on which it is mounted.

Fig. 2 shows the emergency cleat of Fig. 1 in the act of attaching itself automatically to the wheel felly.

Fig. 3 shows a change in the relative position of cleat and wheel felly when the wheel has rolled to a rotary position freeing the tire and the cleat from the weight of the vehicle.

Fig. 4 is a side view of the cleat in Fig. 1 drawn on an enlarged scale.

Fig. 5 is a fragmentary view taken in section on the plane 5—5 in Fig. 4 looking in the direction of the arrows.

Fig. 6 is a fragmentary view taken in section on the plane 6—6 in Fig. 4 showing the tread structure of the cleat partially in section with the toggle bars positioned as in Fig. 1.

Fig. 7 is like Fig. 6 showing the toggle bars in overcentered position as in Figs. 2 and 3.

Fig. 8 shows the position of the parts when the toggle bars are in dead center alignment.

Fig. 9 is an exploded perspective view of parts comprising the tread structure.

Fig. 10 shows the toggle bars of Fig. 8 unconstrained to free the toggle spring from all stress.

The few and simple parts of our improved self attaching tire cleat, as seen most clearly in Fig. 9, comprise rigid side arms 12 and 13 which may be alike except for their rigid inner end portions 14 and 15, respectively, which are sometimes herein referred to as toggle bars, or rocker bars of a toggle joint, one of which bars terminates in a knife edge end 16 and the other of which terminates in a V-grooved end 17. In the assembled relationship of the tread structure of the cleat shown in Figs. 6 and 7 these ends of the rocker bars mutually abut and exert thrust against each other under the constant urge of a rugged leaf spring 20 that is capable of deflecting to a bowed shape. Each rocker arm carries fixedly on its under surface a pivot lug 18 that forms with such under surface an angular seat for the hardened knife-edge of fulcrum heads 19 that are fixedly carried by and may be integral with the resilient metal of leaf spring 20. In its normal shape spring 20 may be flat as shown in Fig. 10, but in all positions which it can occupy in the operative assemblage of parts shown in Figs. 6, 7 and 8, spring 20 is bowed upwardly to varying extents by the spreading stress imposed by lugs 18 against the fulcrum heads 19, 19 that is occasioned by the toggle action thrust of the rocker bars.

The mechanism so far described can be referred to as a resiliently biased overcentering toggle joint in which the rigid overcentering rocker bars constantly act to position both of side arms 12 and 13 either toward or away from each other. Thus these arms are constantly biased either to close toward each other, as they are shown in position in Figs. 2 and 3, or to open away from each other as they are shown in Fig. 1. The amount of space preferred between the side arms 12, 13 and the sides of the pneumatic tire 41 is exaggerated in Figs. 2 and 3.

The angular amount of swinging movement of the rocker bars 14 and 15 is identical with that of the side arms 12 and 13 and the range as well as the amount of this swinging movement is determined in one overcentered relationship of the bars by their abutment downward against the top surface of spring 20 as shown in Fig. 7. At the opposite extreme of their overcentering action the movement of the bars is limited by their abutment upward against a pressure plunger 24 that is slidably mounted in a guide hole 25 contained centrally of the top wall 26 of a housing cover 27. Pressor plunger 24 is kept from leaving its guide hole 25 by an inner head 34 and an outer head 35. Cover 27 comprises a rigid inverted channel iron having pairs of axially aligned holes 28 near the ends of its side walls 29 so located that in the assembled relationship of the parts shown in Figs. 6 and 7 cover retaining pins 30, when lodged in holes 28 crosswise the channel in cover 27, will be nested with moderate looseness in the acute-angled corners formed by the junction of the fulcrum heads 19 with the top surface of leaf spring 20.

Each of the side arms 12 and 13 carries a claw 36 positioned to extend the reach of the arm toward the wheel felly 37. Each claw has a hooked end 38 capable of engaging clingingly with the usual out-turned lip 39 on each side of the wheel felly 37 as shown in Fig. 3. Each of claws 36 also contains an elongate slot 40 which slidingly straddles two spaced apart shouldered studs 44, 44 that are riveted fixedly on each side arm so that the claw is free to shift lengthwise, or up and down, between its full line and broken line positions in Fig. 5. The claw normally is biased to its said full line position by an extension spring coil 45 having one end anchored to the claw at 46 and its other end anchored to its side arm at 47.

While the form of the invention herein disclosed makes use of a single continuous strip of metal forming the side arms 12, 13 integral with the rocker bars 14, 15, respectively, it is obvious that these may be made of separate component parts united rigidly together. If greater longitudinal rigidity is desired in the side arms 12, 13 or in the bars 14, 15 longitudinal ribs may be formed therein for reinforcement against bending stress as is well understood in the art of sheet metal manufacture.

We have found satisfactory strength to reside in arms and bars made of strip steel ¾ inch wide by ⅛ inch thick, while leaf spring 20 can suitably be made of manganese steel or other suitably tempered spring steel. The fulcrum heads 19 may be separate parts or blocks welded or otherwise fixedly secured to the deflectable portion 20 of the spring.

In operation our improved self attaching cleat ordinarily is merely stood on the roadbed at a slippery spot that is refusing to give traction to the wheel and preferably close to the wheel. Then the automobile is driven in direction to roll the tire 41 up onto the pressor plunger 24. The weight of the wheel on the pressor plunger causes the rocker bars 14, 15 to overcenter with an abrupt action from their positions shown in Fig. 6 toward their positions shown in Fig. 7. This snaps the side arms 12, 13 into their positions shown in Fig. 2 where they press against the sides of the felly 37 above the lips 39, it being shown in Fig. 2 that the rocker bars 14, 15 have not come fully into contact with the upper surface of leaf spring 20 in a way to check the closing tendency of the side arms. As the wheel continues to roll carrying the cleat with it the pressor plunger 24 will become relieved of the weight thrust of the wheel so that the pneumatic tire can resume its normal cross sectional shape shown in Figs. 1 and 3 after being distorted into the flattened shape shown in Fig. 2 by the weight of the vehicle. This change in cross sectional shape of the tire draws the claw hooks 38 downward firmly against the felly lips 39 into secure locking engagement therewith.

Freedom for the tire to fully assume its unloaded shape is assured by the ability of the springs 45, 45 to yield and permit sliding movement of the claws 36, 36 relative to the arms 12, 13. When the cleat in traveling around with the wheel again comes into position between the tire tread and the roadbed there will be no tendency of the cleat to be detached from the felly because the parts will merely resume their relative positions shown in Fig. 2. The yielding action of springs 45, 45 also enables the cleat to fit large as well as smaller sizes of tires.

If preferred, the cleat can be attached by hand manipulation, namely by pushing the side arms 12, 13 toward each other or pulling one of them in parting direction inasmuch as swinging movement of the side arms will cause the rocker bars 14, 15 to overcenter with a snap action.

The appended claims are directed to and intended to cover all modifications and equivalents of the particular parts and their relationship herein chosen to illustrate the invention as come within a broad interpretation of the language of the claims.

We claim:
1. An emergency cleat for quick attachment to the rubber tired felly of a vehicle wheel, comprising a tread structure sufficiently long to crown a tire crosswise thereof, side arms pivotally engaging end portions respectively of said structure in a manner to be swingable toward and away from each other while flanking opposite sides of the wheel tire when the latter is crowned by said structure, and a resiliently biased overcentering toggle joint cooperatively relating said arms to each other in a manner urging both of said arms on one occasion toward each other and on another occasion away from each other, whereby said arms are constantly biased to close toward each other and to open away from each other on said respective occasions while straddling the tire.

2. An emergency cleat as defined in claim 1, in which the said tread structure comprises a leaf spring resiliently biasing said overcentering toggle joint.

3. An emergency cleat as defined in claim 1, together with a claw mounted on at least one of said side arms in slidable relation thereto and in position to extend the reach of said arm toward the wheel felly and to engage clingingly with said felly when said arms close toward the same, and a spring connecting said claw to said arm in a manner resiliently urging said claw to slide relatively to said arm in a direction contracting said reach of the latter, whereby said claw is maintained in clinging engagement with the wheel felly when the said tread structure is at various distances therefrom radially of the wheel.

4. An emergency cleat as defined in claim 1, together with claws carried by the said side arms respectively in slidable relation thereto and in position to extend the reach of said arms toward the wheel felly and to engage clingingly with said felly when said arms close toward the same, and springs respectively connecting said claws to said arms in a manner resiliently urging said claws to slide relatively to the arms on which they are mounted in a direction contracting said reach of the arms, whereby said claws are maintained simultaneously in clinging engagement with the wheel felly when the said tread structure is at various distances therefrom radially of the wheel.

5. An emergency cleat for quick attachment to the rubber tired felly of a vehicle wheel, including a tread structure sufficiently long to crown a tire crosswise thereof, side arms disposed to flank opposite sides of the tire having inner end portions comprising rocker bars extending toward each other lengthwise of said tread structure and mutually abutting end-to-end in a manner to form an overcentering toggle joint, and a leaf spring connecting said bars in a manner resiliently to oppose relative movement thereof into dead centered relationship, whereby said arms are constantly biased on one occasion to close toward each other and on another occasion to open away from each other while flanking the tire.

6. An emergency cleat as defined in claim 5, together with a housing loosely covering the said inner end portions of the said arms, and a member for overcentering said rocker bars movably mounted on said housing in position to transmit the weight thrust of a vehicle tire to at least one of said rocker bars in a direction to force said abutting end portions of both of said bars into and past dead centered relationship, whereby said arms are caused by said thrust on said member to close toward each other with an abrupt action.

7. An emergency cleat as defined in claim 5, in which the said spring extends lengthwise of the said tread structure, together with knife bearings carried by said leaf spring pivotally engaged respectively by the said rocker bars.

8. An emergency cleat as defined in claim 5, in which each of the said arms and its respective rocker bar is composed of a single integral rigid strip of metal.

9. An emergency cleat as defined in claim 5, together with stops limiting the departure of the said rocker bars from dead centered relationship in each direction to an extent maintaining the said leaf spring constantly in bowed shape.

10. An emergency cleat as defined in claim 5, in which the surface of the said leaf spring farthest from the wheel is exposed for contact with the roadbed.

11. An emergency cleat as defined in claim 5, together with a housing disposed to intervene between the said rocker bars and the wheel tire loosely covering the faces of the said rocker bars nearest the wheel tire, and stays loosely anchoring said housing to the said leaf spring in a manner leaving the latter free for bowing deflection.

12. An emergency cleat as defined in claim 11, together with a pressor plunger slidably guided in the said housing in position to transmit weight thrust from the tire to the said rocker bars.

References Cited in the file of this patent
UNITED STATES PATENTS

| Number | Name | Date |
|---|---|---|
| 2,440,863 | Liggio | May 4, 1948 |
| 2,445,947 | Hoppes | July 27, 1948 |
| 2,520,260 | Robblee | Aug. 29, 1950 |
| 2,525,367 | Miller | Oct. 10, 1950 |

FOREIGN PATENTS

| Number | Country | Date |
|---|---|---|
| 481.280 | Canada | Feb. 26, 1952 |